(12) United States Patent
Han et al.

(10) Patent No.: US 9,754,545 B2
(45) Date of Patent: Sep. 5, 2017

(54) METHOD OF MORE QUICKLY CALIBRATING DISPLAY PANELS AND CALIBRATION APPARATUS FOR PERFORMING THE SAME

(71) Applicant: Samsung Display Co., LTD., Yongin, Gyeonggi-Do (KR)

(72) Inventors: Jung-Suk Han, Hwaseong-si (KR); Hoi-Sik Moon, Asan-si (KR); Kang-Hyun Kim, Seoul (KR); Jong-Hee Na, Cheonan-si (KR); Woo-Jin Jung, Seoul (KR); Jae-Seob Chung, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 230 days.

(21) Appl. No.: 14/341,590

(22) Filed: Jul. 25, 2014

(65) Prior Publication Data
US 2015/0194105 A1    Jul. 9, 2015

(30) Foreign Application Priority Data
Jan. 3, 2014    (KR) .................. 10-2014-0000705

(51) Int. Cl.
*G09G 5/10*    (2006.01)
*G09G 3/36*    (2006.01)
(Continued)

(52) U.S. Cl.
CPC ......... *G09G 3/3648* (2013.01); *G02F 1/1309* (2013.01); *G09G 3/2003* (2013.01);
(Continued)

(58) Field of Classification Search
CPC .............. G09G 3/2003; G09G 3/3607; G09G 2320/0673; G09G 2320/0276; G09G 2320/0693; H04N 3/127
See application file for complete search history.

(56) References Cited

U.S. PATENT DOCUMENTS

| 8,106,866 B2 | 1/2012 | Wang |
| 8,487,949 B2 | 7/2013 | Morimoto |
(Continued)

*Primary Examiner* — Hang Lin
(74) *Attorney, Agent, or Firm* — Innovation Counsel LLP (57) ABSTRACT

A method of reducing a total, per device, measurements taking time in a calibration system that uses a sensor array that serially reports out its readings and a data processing unit that needs to receive the reported out readings in good order before allowing an under-measurement first display device to advance away from a measurements taking station includes the step of not driving the first display device with all of required full screen test images where each is a full screen display of only a respective one of a predetermined minimum number of grayscale values produced as a minimum number of needed full screen sample images and; in place of at least a first plurality of the not-produced full screen images, driving the under-measurement first display device with a partial screen multi-pattern that presents a plurality of different grayscale values including ones not presented by those of all of the full screen test images that are used to drive the under-measurement first display device. The serially reported out readings from the sensor array for the partial screen multi-pattern and for the full screen test images are obtained and used to generate virtual full screen sample images based on the obtained partial screen multi-pattern and for the full screen test images.

15 Claims, 8 Drawing Sheets

(51) Int. Cl.
*G09G 3/20* (2006.01)
*G02F 1/13* (2006.01)

(52) U.S. Cl.
CPC ........... *G09G 2320/0233* (2013.01); *G09G 2320/0276* (2013.01); *G09G 2320/068* (2013.01); *G09G 2320/0666* (2013.01); *G09G 2320/0693* (2013.01)

(56) References Cited

U.S. PATENT DOCUMENTS

| | | |
|---|---|---|
| 8,542,256 B2 | 9/2013 | Kim |
| 2006/0284898 A1* | 12/2006 | Shen ................. G09G 3/006 345/690 |
| 2007/0057975 A1 | 3/2007 | Oh et al. |
| 2008/0309766 A1 | 12/2008 | Lin |
| 2010/0026728 A1* | 2/2010 | Miyazaki ............ G09G 3/36 345/690 |
| 2010/0259551 A1* | 10/2010 | Kao .................... G09G 5/02 345/590 |
| 2010/0259555 A1* | 10/2010 | Hibi ................. G09G 3/3611 345/601 |
| 2011/0254759 A1* | 10/2011 | Mori ................ G09G 3/3607 345/88 |
| 2012/0162168 A1 | 6/2012 | Ku et al. |
| 2013/0120659 A1 | 5/2013 | Park et al. |
| 2013/0141409 A1 | 6/2013 | Kosei |

\* cited by examiner

METHOD OF MORE QUICKLY CALIBRATING DISPLAY PANELS AND CALIBRATION APPARATUS FOR PERFORMING THE SAME

PRIORITY STATEMENT

This application claims priority under 35 U.S.C. §119 to Korean Patent Application No. 10-2014-0000705, filed on Jan. 3, 2014 in the Korean Intellectual Property Office KIPO, the contents of which application are herein incorporated by reference in their entireties.

BACKGROUND

1. Field

The present disclosure of inventive concept(s) relates to a method of calibrating a plurality of display panels on a mass production basis, a method of mass producing calibrated ones of such display panels, and a calibration apparatus for performing the methods. More particularly, exemplary embodiments in accordance with the present inventive concept(s) relate to a method of calibrating each of a plurality of mass produced display panels while substantially decreasing an amount of time consumed for taking measurements for each individual one of the mass produced display panels while still achieving a desired degree of accurate calibration and to a calibration apparatus for performing the faster measurement takings.

2. Description of Related Technology

Generally, a liquid crystal display ("LCD") apparatus includes a first substrate including a plurality of pixel electrodes, a spaced apart second substrate which often includes a common electrode provided thereon and color filters corresponding to primary colors, where a liquid crystal layer is disposed between the first and second substrates. The primary colors may be mixed to produce a desired white (having a respective optical "temperature"). In the LCD, an electric field is generated by voltages applied to the pixel electrode and the common electrode. By adjusting an intensity of the electric field, a transmittance of a light passing through the liquid crystal layer for each primary color may be adjusted so that a desired color image may be formed and displayed.

The LCD display apparatus includes display control circuitry for controlling it so as to display an image corresponding to input image data. To improve reliability of the correspondence between the displayed image and the input image data, typically the whole of the display panel is calibrated by programming it with one or more gamma values and one or more color coordinate mapping values (gamut mappings). For sake of accuracy; it may be desirable to perform gamma calibration and gamut mapping for each of all the possible grayscale values (for example 0-255) and for each subarea of the whole display area (DA) so as to thereby produce a uniformly consistent image for all possible grayscale values and across the whole of the display area of the display apparatus.

More specifically, the gamma value(s) and the color coordinate re-mapping value(s) assigned to each individual display panel may be used to compensate for variations among mass produced display apparatuses coming down an assembly line. The appropriate gamma values and color coordinate values may be extracted for example, by taking measurements at all sub-areas of the full display area (DA) by using all the possible grayscales for each such sub-area. However, this can be too time consuming. For example, when the input image data can have a maximum of 256 different grayscales (GS=0-255) and each measurements taking (e.g., exposure to a measurements taking camera) consumes a finite amount of time, the total time for merely measuring each of the plural display panels in a mass produced steam of such panels can be quite considerable. Subsampling has been proposed to reduce the per panel measurements taking time. Under one subsampling approach, the number of measurements taking exposures has been reduced, but to no less than 10% of the maximum. More specifically, gamma values and color coordinate values of 25 different grayscales are taken on a full screen-per-grayscale bases and then interpolation is used for calibrating the gamma values and the color coordinate re-mappings of all 256 of different grayscales of the display panel.

However, even when snapshot images of 25 sample and full screen grayscales are taken under the 10% subsampling approach and while using an appropriate camera apparatus, a time duration of about 200 ms may be needed for the full screen camera exposure for each one sample grayscale image and an additional 300 ms is needed for serially transmitting the measured data to an appropriate data processing means, where the data is first tested for integrity before the next display panel on the assembly line is allowed to come in front of the camera. Therefore, a minimum time of about 500 ms may be needed for each full screen snapshot and a total time of about 12.5 s (seconds) may be needed for taking the calibration measurements of each single display panel in a mass produced stream of such display panels so that appropriate gamma values and the color coordinate re-mappings values may be programmed into each. This can disadvantageously slow production and increase manufacturing costs. (In a variation, the amount of desired exposure time may vary as a function of the grayscale under measurement, with the darker or lower grayscale values (e.g., closer to GS=0) calling for longer exposure durations and the brighter or higher valued grayscales (e.g., closer to GS=255) calling for comparatively shorter exposure durations.)

As explained above, quite a lot of time may be needed for measurements taking steps during the calibrating of the gamma values and of the color coordinate re-mapping values of each of mass produced display panels. In addition, when all of the display panels of a mass production batch are not individually calibrated due to limits on time availability, the, reliability of the luminance and color balance characteristics of the display panels produced from the batch may decrease. In order for the manufacturer to maintain a reputation of excellent reliability for each display panel in a batch of mass produced and sold display panels, it is desirable that every display panel be individually tested and calibrated rather than relying on batch statistics and hoping that sporadic testing is good enough. On the other hand, it is also desirable for the cost of producing a batch of individually calibrated display panels to be low so that the manufacturer can pass at least part of the cost saving to consumers. The problem is how to achieve both of reduced measurements taking/gathering time and of obtaining a sufficient number of samples in a subsampling process.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of inventive concept(s) provides a method of calibrating display panel where the method is capable of decreasing a measurements taking time used for generating calibration factors for the display panel.

Exemplary embodiments of the present inventive concept(s) also include a method of driving a display panel including the method of compensating for partial screen images produced on the display panel.

Exemplary embodiments of the present inventive concept also provide a display apparatus for performing the method of driving the display panel.

In an exemplary embodiment of a method of calibrating the display panel according to the present inventive concept(s), the method includes measuring luminance and color attribute of a plurality of full screen grayscale images, the full screen grayscale images, measuring luminance and color attribute of a multi pattern image, the multi pattern image including a plurality of multi grayscales. The method may further include generating a first compensating value accounting for changing a position of a multi grayscale region in the multi pattern image from an off center position to a central portion of the multi pattern image and compensating luminance and color attribute of the display panel based on the luminance and the color measurement takings obtained from the full screen images and from the multi pattern image.

In an exemplary embodiment, a first compensating value for producing virtualized full screen images may be generated using a high full image and a low full image, the high full image having a high full grayscale which is one of the full grayscales greater than the multi grayscale and adjacent to the multi grayscale, the low full image having a low full grayscale which is one of the full grayscales less than the multi grayscale and adjacent to the multi grayscale.

In an exemplary embodiment, the generating the first compensating value may include determining a first difference between a measured value of the high full grayscale at a first position and a measured value of the high full grayscale at a second position in the high full image and a second difference between a measured value of the low full grayscale at the first position and a measured value of the low full grayscale at the second position in the low full image, the first position being a central portion of the multi pattern image, the second position being the position of the multi grayscale region and linearly interpolating the first difference and the second difference using the high full grayscale, the multi grayscale and the low full grayscale.

In an exemplary embodiment, the multi pattern image may include a common multi grayscale which is substantially the same as one of the full grayscales.

In an exemplary embodiment, the method may further include generating a second compensating value using a ratio between a measured value of the full grayscale which is substantially the same as the common multi grayscale and a measured value of the common multi grayscale in the multi pattern image.

In an exemplary embodiment, a measured position of the measured value of the full grayscale which is substantially the same as the common multi grayscale may be substantially the same as a measured position of the measured value of the common multi grayscale in the multi pattern image.

In an exemplary embodiment, the number of the full pattern images may be greater than or equal to three.

In an exemplary embodiment, the number of the multi pattern images may be two. A first multi pattern image among the multi pattern images may correspond to relatively low grayscales and a second multi pattern image among the multi pattern images may correspond to relatively high grayscales.

In an exemplary embodiment of a method of driving a display panel according to the present inventive concept, the method includes measuring luminance and color of a plurality of full pattern images, the full pattern image including a single full grayscale, measuring luminance and color of a multi pattern image, the multi pattern image including a plurality of multi grayscales, generating a first compensating value to displace a position of a multi grayscale region in the multi pattern image to a central portion of the multi pattern image, compensating luminance and color of input image data based on the input image data, the luminance and the color of the full pattern image, the luminance and the color of the multi pattern image and the first compensating value to generate a data signal and displaying an image on the display panel based on the data signal.

In an exemplary embodiment, the first compensating value may be generated using a high full image and a low full image, the high full image having a high full grayscale which is one of the full grayscales greater than the multi grayscale and adjacent to the multi grayscale, the low full image having a low full grayscale which is one of the full grayscales less than the multi grayscale and adjacent to the multi grayscale.

In an exemplary embodiment, the multi pattern image may include a common multi grayscale which is substantially the same as one of the full grayscales.

In an exemplary embodiment, the method may further include generating a second compensating value using a ratio between a measured value of the full grayscale which is substantially the same as the common multi grayscale and a measured value of the common multi grayscale in the multi pattern image.

In an exemplary embodiment, the number of the full pattern images may be greater than or equal to three.

In an exemplary embodiment of a display apparatus according to the present inventive concept, the display apparatus includes a timing controller, a data driver and a display panel. The timing controller is configured to compensate luminance and color of input image data to generate a data signal based on the input image data, luminance and color of a plurality of full pattern images, luminance and color of a multi pattern image and a first compensating value to displace a position of a multi grayscale region in the multi pattern image to a central portion of the multi pattern image, the full pattern image including a single full grayscale, the multi pattern image including a plurality of multi grayscales. The data driver is configured to convert the data signal into a data voltage having an analog type. The display panel is configured to display an image based on the data voltage.

In an exemplary embodiment, the first compensating value may be generated using a high full image and a low full image, the high full image having a high full grayscale which is one of the full grayscales greater than the multi grayscale and adjacent to the multi grayscale, the low full image having a low full grayscale which is one of the full grayscales less than the multi grayscale and adjacent to the multi grayscale.

In an exemplary embodiment, the multi pattern image may include a common multi grayscale which is substantially the same as one of the full grayscales.

In an exemplary embodiment, the timing controller may be further configured to generate a second compensating value using a ratio between a measured value of the full grayscale which is substantially the same as the common multi grayscale and a measured value of the common multi grayscale in the multi pattern image.

In an exemplary embodiment, the number of the full pattern images may be greater than or equal to three.

According to the method of compensating the image of the display panel, the method of driving the display panel including the method of compensating the image of the display panel and the display apparatus for performing the method of driving the display panel, time for compensating the image of the display panel. In addition, an error due to a use of multi-patterned image is compensated so that accuracy of compensating the gamma value and the color coordinate of the image may be improved. Thus, the gamma values and the color coordinates may be compensated for all of the display panels so that reliability of the display apparatus may be improved.

BRIEF DESCRIPTION OF THE DRAWINGS

The above and other features and advantages of the present disclosure of inventive concept(s) will become more apparent by describing in detailed exemplary embodiments thereof with reference to the accompanying drawings, in which.

DETAILED DESCRIPTION

Hereinafter, the present disclosure of inventive concept(s) will be explained in detail with reference to the accompanying drawings.

Figure 1:
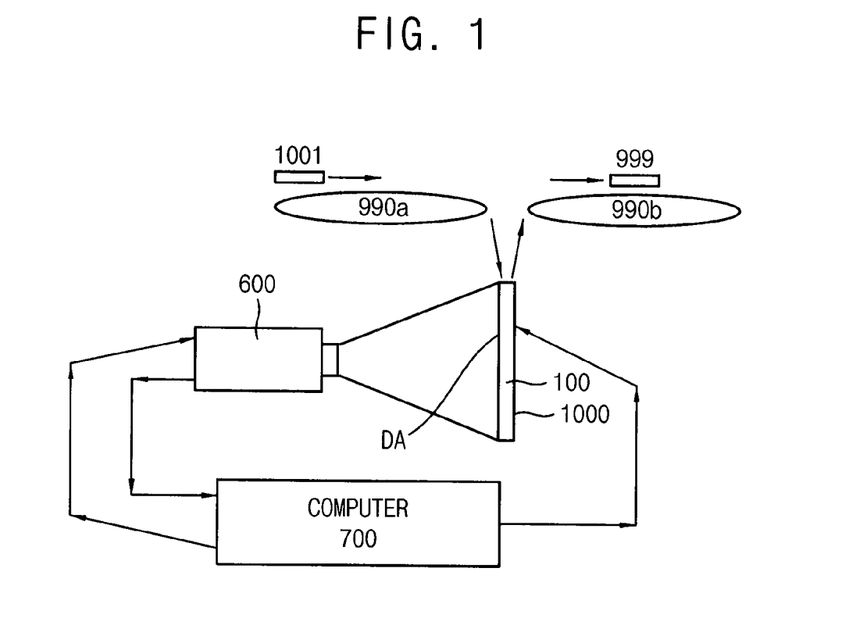
FIG. 1 is a block diagram illustrating a measurements taking portion of a mass production display calibrating system according to an exemplary embodiment in accordance with the present disclosure.
Figure 2:
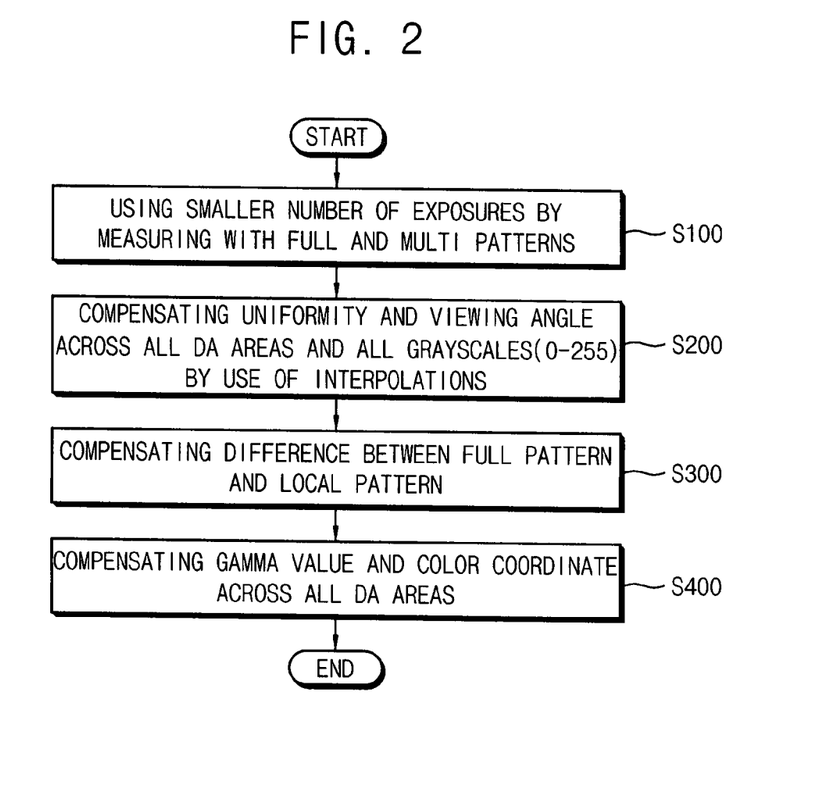
FIG. 2 is a flowchart illustrating a method of measurements taking and calibrating of a display panel of FIG. 1.
Figure 3A:
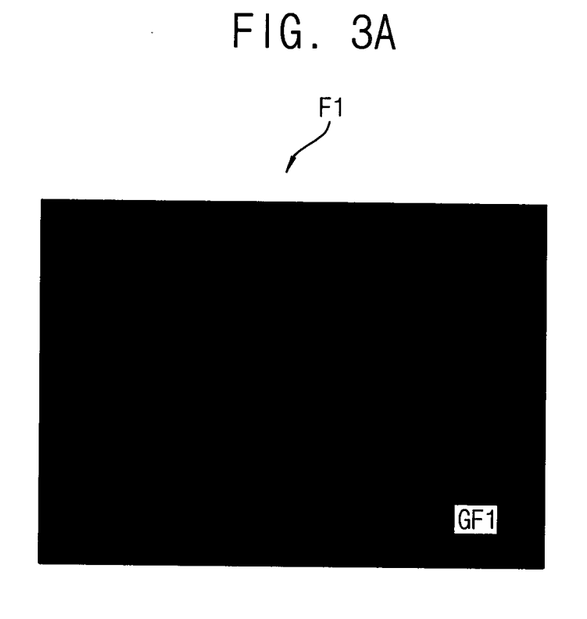
FIGS. 3A to 3C are plan views illustrating full patterns for compensating the image of the display panel of FIG. 1.
Figure 3B:
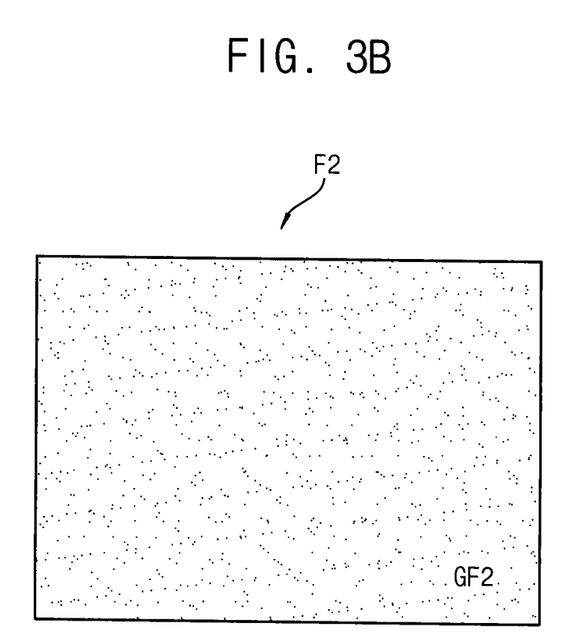
Figure 3C:
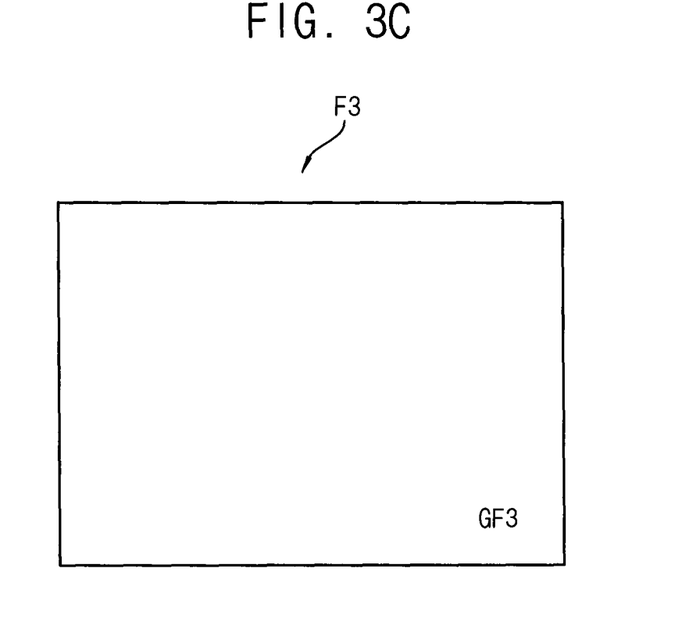
Figure 3D:
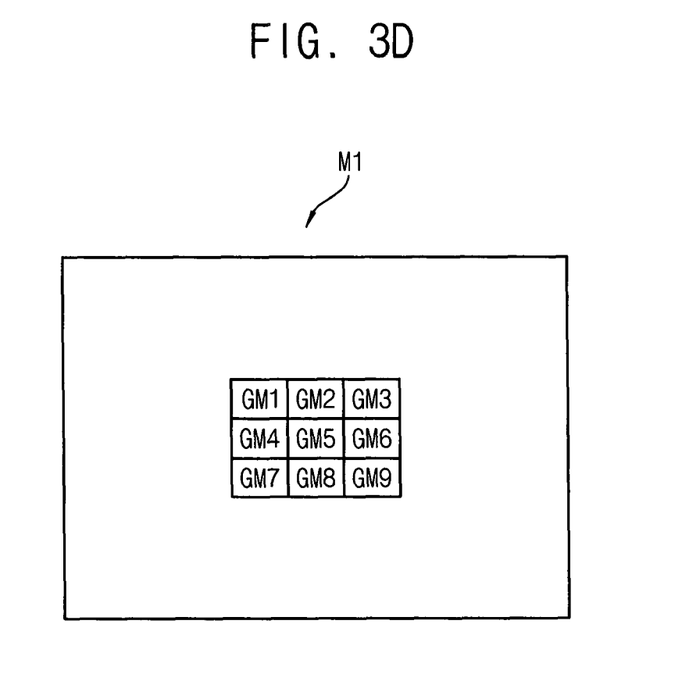
FIG. 3D is a plan view illustrating a multi pattern for compensating the image of the display panel of FIG. 1.

FIG. 1 is a block diagram illustrating a measurements taking and display calibrating system configured in accordance with an exemplary embodiment of the present disclosure for calibrating a stream of mass produced display panels. FIG. 2 is a flowchart illustrating a method of performing compensation (including measurements taking) for the display panel of FIG. 1. FIGS. 3A to 3C are plan views illustrating so-called, "full" screen gray drive patterns (GF's) used for generating compensation parameters based on the images produced by the display panel of FIG. 1 and captured and reported by the camera apparatus. FIG. 3D is a plan view illustrating a so-called, "multi" pattern (GM) used for generating compensation parameters based on the image of the display panel of FIG. 1.

Referring to FIG. 1, the system includes an assembly line 990a-990b that sequentially supplies, mass produced display devices 999, 1000, 1001, etc. to a luminance and color measuring part 600 (a.k.a. camera 600 having an internal sensor array), where the display device (e.g., 1000) posing in front of the camera 600 has an exposure thereof taken and where the results of the exposure (a.k.a. measurements taking) are then reported to a controlling data processing unit (e.g., computer) 700 by way of a serial communications link (e.g., from a serially scanned sensor array (e.g., CCD array, not shown) within the camera 600). The data processing unit 700 controls the drivings of the measuring part 600 (e.g., starting/stopping of exposure duration for example by controlling an electrically actuated shutter, controlling an electrically actuated aperture window, defining address ranges of the sensor array that are to report out their latest readings) and of the being-exposed display apparatus (e.g., 1000) and collects measurement signals produced and transmitted thereto by the measuring part 600. Part of the measurement signals collecting process is that of verifying that all the desired measurement signals have been received and are not corrupted, for example by noise. Therefore, the being-exposed display apparatus (e.g., 1000) is not released for away-conveyance by a downstream part 900b (e.g., robotic arm) of the assembly line until all the desired measurement signals are verified as having been received in good order by the data processing unit 700. And only thereafter is the next in line and to-be-tested display apparatus (e.g., 1001) conveyed into position by an upstream part 900a (e.g., robotic arm) of the assembly line so that this next in line display apparatus (e.g., 1001) can have its pictures taken by the camera 600.

Figure 7:
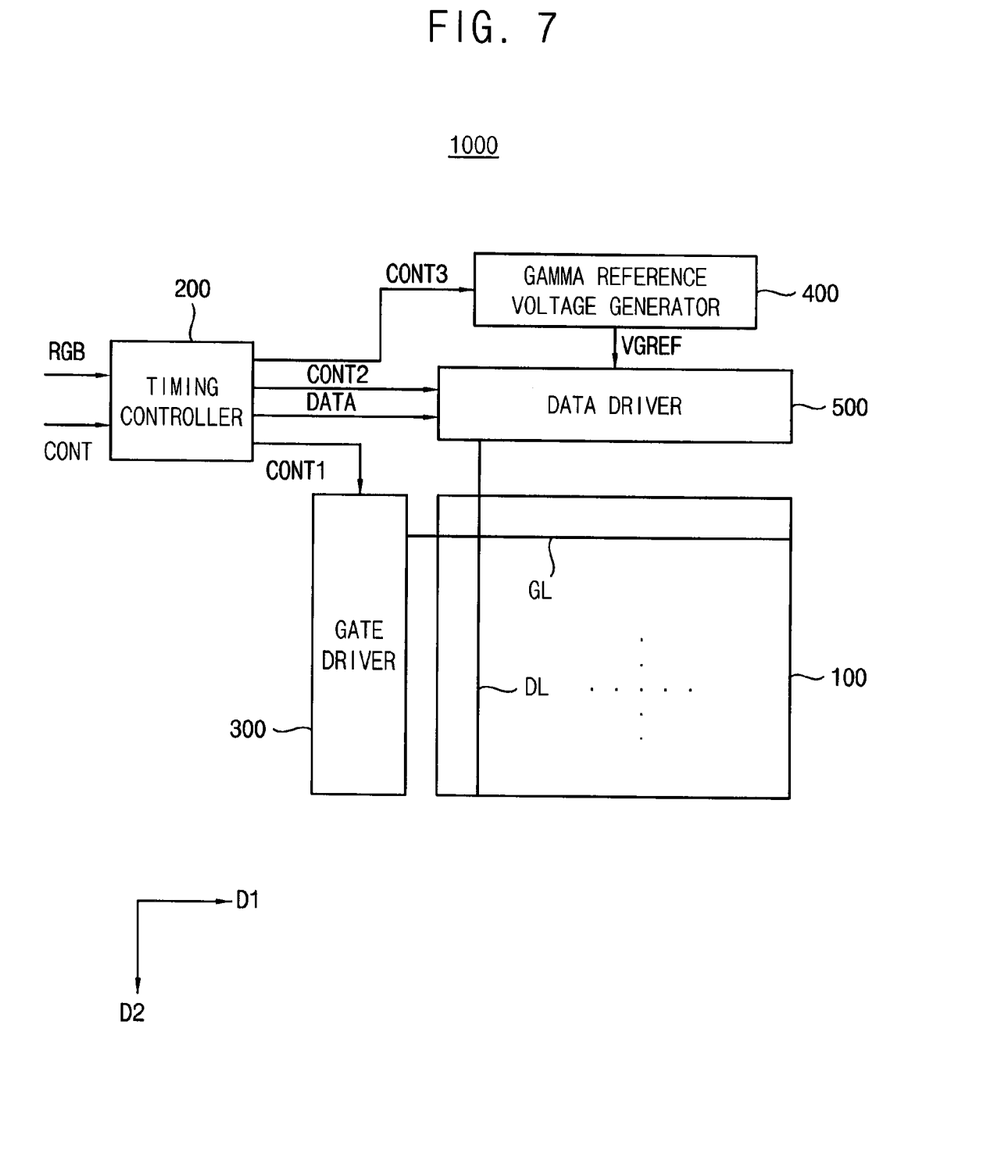
FIG. 7 is a block diagram illustrating a display apparatus for performing a method of driving the display panel including the method of compensating the image of FIG. 2.

After being calibrated, each display apparatus (e.g., 999, 1000, 1001, etc.) displays an image based on input image data and on set compensation parameters (e.g., gamma, white point and data remappings) used by corresponding control circuitry (e.g., timing controller and data lines driver, not shown here, see FIG. 7). Each display apparatus (e.g., 1000) includes a display panel 100 that has a plurality of pixels provided thereon, with each pixel being independently drivable by a respective pixel drive signal, for example, a pixel electrode drive voltage. Each pixel may have a corresponding color filter (not shown) disposed thereon such that the optical output of the individual pixel is dependent on the idiosyncrasies of its respective filter materials. During mass production, the characteristics of filter materials (e.g., including optical transmittance and degree of wavelength filtering) may vary due to changes of supply source, temperature, solvent mixings, etc. Thus it may not be known until actual measurements are taken, what compensating adjustments (e.g., image data value remappings) need to be made for achieving desired luminances across all grayscale values (e.g., 0-255) and for achieving desired color purities and/or white point temperatures.

The luminance and color measuring part 600 of FIG. 1 is disposed as spaced apart from a corresponding display area (DA) of the display panel under test 100 and in accordance with a predetermined, trapezoidal light intake volume (where the setup could include an opaque light shield encasing and defining the trapezoidal intake volume). The combination of measuring part 600 (a.k.a. camera 600) and intake volume are used to obtain measurements of one or more of luminance values and color purity (e.g., spectrum distribution) values of the images displayed by the display apparatus 1000. For example, the luminance and color measuring part 600 may be a camera that includes a focusing and magnification lens (optionally adjustable), one or more (and optionally selectable) wavelength filters and a light detecting sensor matrix (e.g., a CCD charge coupled one, not shown) responsive to light rays passed through the focusing lens, through one or more of the selectable wavelength filters, where the light rays may have respective angles of travel from corresponding light source points on the display area of the display panel 100 to counter-corresponding light detection points on the light detecting sensor matrix. The light detecting sensor matrix (e.g., CCD, not shown) is, or is coupled to a serial information communicating element (e.g., serial digital data) and as such it requires a minimum predetermined amount of time per photons capturing area on its face to communicate the collected photons information. The more such individualized photon capturing areas (e.g., sensor pixels) there are, the longer it takes for the camera 600 to serially communicate all its taken measurements to the data receiving external unit (e.g., computer 700). In one embodiment, it takes about 300 ms (milliseconds) to serially communicate all the measurements of a so-called, "full screen" exposure. In the optional case where the camera 600 has adjustable focusing, adjustable aperture and/or adjustable magnification factor lens, it may take additional time to adjust these for each of successive exposures. Moreover, it takes a finite amount of time for the measuring part 600 to collect a sufficient intake of photons during each respective exposure (while its electrically controlled shutter is open). In one embodiment, it takes about 200 ms (milliseconds) per exposure. (In one variation, less exposure time is needed for brighter grayscale values. In another variation, a same amount of minimum exposure time is needed irrespective of grayscale value.) Thus, assuming a fixed 200 ms for each exposure and a fixed 300 ms to output the full screen results, it takes about 500 milliseconds for taking each snapshot (assuming no additional time is consumed for optional adjustments). Accordingly, when plural snapshots are required (e.g., a minimum of 25 full screen samples) for completing a high precision calibration process, a large amount of time may be consumed for appropriate measurements taking, serially reporting out the measurements and for appropriately calibrating each of a plurality of mass produced display apparatuses 999, 1000, 1001 on the basis of their respective measurements taking and reporting operations.

In one embodiment, the luminance and color measuring part 600 is fixedly disposed to have a central focus line corresponding to a central portion of the display panel 100 and an adjustable measurements reporting parameter that determines how much of a centrally disposed area of the camera's sensor array (e.g., CCD array) will report out its results by way of serial communication. If the full area of the sensor array (e.g., CCD array) reports out that takes a first predetermined amount of time. On the other hand, if a smaller (less than full) area of the sensor array reports out that takes a second predetermined amount of time which is less than the first predetermined amount of time. The data processing unit (e.g., computer 700) may be configured to alter the address ranges of the sensor pixels that report out their results (e.g., via a serial link) and/or to alter the exposure duration (e.g., shutter open time) of each exposure.

In other words, the luminance and color measuring part 600 may consume a first amount of time to output first measurement signals corresponding to the luminance and colors of the entire display area (DA) of the display panel 100 when a so-called, "full screen" exposure is commanded by the data processing unit 700. On the other hand, the luminance and color measuring part 600 may consume a second and shorter amount of time to output second measurement signals corresponding to the luminance and colors of only a portion of the entire display area (DA) of the display panel 100 when a so-called, "partial screen" exposure is commanded by the data processing unit 700 and/or when a shorter exposure duration is commanded. In one embodiment, when a "partial screen" exposure is commanded, the luminance and color measuring part 600 outputs its second measurement signals as corresponding to the luminance and colors of a specific pre-specified one or more subsections of the entire display area (DA), for example of only a central subportion of the display panel 100 having a predetermined size that is subdivided into predetermined and equal area subsections (e.g., in the below described "multi-pattern" mode).

As part of the sped-up calibration process disclosed here, the display panel 100 is selectively driven to display a so-called, "full" pattern image. The "full" pattern image is one that drives all the pixels of the display area (DA) in a same one way, for example by applying a same pixel electrode drive voltage to all the pixels. The luminance and color measuring part 600 captures the full pattern image and correspondingly reports out to the data processing unit 700 all of the sensed luminances and color points (e.g., in CIE 1931 space) of the full pattern image (step S100). In other words, the full pattern image is a sample image which is produced using a single grayscale value for driving all the pixels (where in one case, each pixel is understood to include primary color subpixels such as Red, Green and Blue such that the pixels can produce a corresponding shade of white light). In the present specification, the single driving grayscale signal of the full pattern image and its capture is referred to as a "full" grayscale exposure run.

More specifically, by using different and respective, single driving grayscale signals, the display panel 100 may be caused to display a plurality of different "full" patterns. The luminance and color measuring part 600 may receive the corresponding full pattern images for each of these grayscale drive values and may determine the respective full screen luminance and full screen color attributes of the respective but different full pattern images. On the other hand, by limiting the number of different full pattern images used (e.g., by not displaying all possible grayscale values as full screen images) and by using various interpolation techniques to interpolate for the expected values of most or all other such full pattern images across the full grayscale values range (e.g., 0-255) of the display apparatus 1000, it is possible to reduce the time consumed by the calibration process. In one embodiment, less than 25 full screen exposures are taken and in addition, one or a few partial screen/ multi-gray exposures are taken. The partial screen/multi-gray exposures consume less time for exposure and/or out-reporting than do their corresponding full screen exposures and thus the overall time for measurements taking can be advantageously reduced. In one embodiment, when a partial screen/multi-gray exposure is used, the read-outs from its respective and different grayscale value areas are converted into virtualized full screen images by way of a virtualization process that includes the steps of virtually repositioning the sensed grayscale value area to a central position of the full screen and virtually expanding the repositioned image to fill the full screen area while mimicking camera and panel distortion attributes such that the generated, virtualized full screen image closely approximates what an actual full screen image for that grayscale value would have looked like.

FIG. 3A represents a driving of the display panel 100 with a first full pattern image signal F1 corresponding to a first full grayscale value GF1. FIG. 3B represents a driving of the display panel 100 with a different second full pattern image signal F2 corresponding to a second full grayscale value GF2. FIG. 3C represents a driving of the display panel 100 with a different third full pattern image signal F3 corresponding to a third full grayscale value GF3.

For example, the first full grayscale GF1 may be a near-black grayscale representing a substantially black but not totally black image. For example, given a range of 0 to 225, the first full grayscale value GF1 may have a value of about four (4) in such a 0-255 grayscales range.

The second full grayscale value GF2 may be a medium grayscale value representing an image of intermediate brightness between the near-black image and a white or near-white further image. For example, the second full grayscale value GF2 may be closer to the near black grayscale value than to a fully-white grayscale. For example, the second full grayscale GF2 may have a value of about 64 in such a grayscales range (0-255).

The third full grayscale GF3 may be the maximum whiteness drive signal representing the fully white image. For example, the third full grayscale GF3 may have a value of 255 in such a grayscales range (0-255).

It has been empirically found that for good accuracy; at least 25 such different and full screen exposures should be taken. However, in accordance with one embodiment of the present disclosure, just the aforementioned three full screen exposures are taken and at least one partial screen exposure (FIG. 3D, described shortly below) is taken. Although, in this given example the display panel 100 is caused to display just three full screen images GF1, GF2 and GF3, the present inventive concept is not limited thereto and the display panel 100 may be caused to automatically display a slightly larger number of such different but full screen exposure images (say four to six) with the understanding that an object of the present teachings is to reduce time consumed per display device (999, 1000, 1001) for measurements taking and for subsequent generating of its compensation parameters (e.g., compensating for deviation in luminance from desired output levels, for nonuniformity of luminance across the full screen and/or for nonuniformity of color across the full screen and/or for nonuniformity of side-view visibility across the full screen).

In addition to causing the display panel 100 to display just a small number (e.g., 3 to 6) of different full screen images (GF1-GFn), in order to calibrate the display panel 100 in accordance with the present teachings, the display panel 100 is caused to display at least one smaller-area, "multi" pattern image as driven by a corresponding at least one multi-pattern image signal M1 (FIG. 3D). The rest of the display area may be driven full black or otherwise. When the partial screen mode (e.g., FIG. 3D) is in effect, the luminance and color measuring part 600 is controlled by the data processing unit 700 to focus report-out just the sensor array readings for the smaller area of the partial screen. Accordingly, less time is consumed for reporting out only the sensor readings of the partial screen. The data processing unit 700 receives the output sensor readings of the multi pattern image and uses them in combination with interpolation techniques to determine corresponding further luminances and corresponding color coordinate values expected of full screen versions of the actually measured, but smaller area grayscale regions of the multi pattern image. The measurements taking operations of the exemplary four exposures of FIGS. 3A-3D is referred to in the flowchart of FIG. 2 as a fewer exposures and smaller report-out step (S100). Each multi pattern image (e.g., FIG. 3D) is a sample image which has a plurality of different grayscales. In accordance with one optional but not necessary aspect of the present disclosure, the multi pattern image covers substantially less than the full display area (DA). However, as will be understood, it is possible to attain some of the advantages of the present teachings even if the multi pattern image is a full screen one so long as different grayscale values are included within the multi pattern image, where these are called multi grayscales.

In one embodiment, a 25 full screen exposures test where the respective grayscale values are: GS=0, 3, 5, 8, 10, 15, 20, 25, 30, 35, 40, 50, 60, 70, 80, 90, 100, 110, 130, 150, 170, 190, 210, 230, 255 in the case of the full grayscale values range being 0-25. In place of those 25 full screen exposures, in one embodiment, only 9 full screen exposures are taken having respective and different grayscale values of GS=0, 8, 20, 35, 60, 90, 130, 190 and 255. In addition, two "multi-pattern" mode exposures of partial screen size are taken (e.g., FIGS. 4A-4B) having respective and different grayscale values of GS=3, 5, 10, 15, 20, 25, 30, 40 and 50 for the so-called, darker "multi-pattern" mode exposure (e.g., FIG. 4A) and having respective and different grayscale values of GS=70, 80, 100, 110, 130, 150, 170, 210 and 230 for the so-called, brighter "multi-pattern" mode exposure (e.g., FIG. 4B). It may be noted that in this given example, the grayscale value of GS=20 appears as one of the full screen exposures and also as a repeated grayscale value inside the darker "multi-pattern" mode exposure. Similarly, the grayscale value of GS=130 appears as one of the full screen exposures and also as a repeated grayscale value inside the brighter "multi-pattern" mode exposure. These few, repeated grayscale values may be used as anchor points for cross correlating (e.g., normalizing) as between the results of the full screen exposures and the results of the "multi-pattern" mode exposures. (Each of the darker and brighter multi-pattern exposures has 8 grayscale values different from any of the 9 full screen exposures. Therefore the total number of different grayscale values used for measurements taking is 9+8+8 which corresponds to 25 different grayscale values.

More specifically, as another example and in addition to the respective three full screen exposures of FIGS. 3A-3C, the display panel 100 may be caused to display just one multi pattern image presenting 9 different grayscale values GS=GM1, GM2, . . . , GM9 and occupying only a central portion of the display area (DA) as illustrated in FIG. 3D. Alternatively, the display panel 100 may be caused to display a greater but nonetheless relatively small number rather than just one of such multi pattern images (say two or three) with the understanding that an object of the present teachings is to reduce time consumed per display for number of exposures taken and amount of time consumed reporting out to the data processing unit 700 the readings of each exposure. The data processing unit 700 verifies that the reported out readings are in good order and then the under test display device (e.g., 1000) may be moved away from the camera 600 so a next in line display device (e.g., 1001) can take its place. The data processing unit 700 may continue to remain in contact with the moved away first display device (e.g., 1000) and may generate its respective compensation parameters (those for device 1000) and program them into that device (e.g., 1000) after it has move away. At the same time, the data processing unit 700 may handle the exposures process for the next in line display device (e.g., 1001). Therefore, the speed of the mass production line is improved.

As a different example, the case may be that the display panel 100 instead displays two multi pattern images, where a first of these multi pattern images includes relatively low multi grayscales that require a comparatively longer exposure time while the second multi pattern image includes relatively higher multi grayscales which in one embodiment, require a comparatively shorter exposure time when poising in front of camera 600. In the latter case, a shorter exposure time is used for the relatively higher multi grayscales and as a result, time consumed for measurements taking is advantageously reduced.

FIG. 3D represents the first multi pattern image M1. For example, a first multi grayscale value (different from those of FIGS. 3A-3C) may be displayed as a first multi pattern image GM1 disposed at an upper left corner of the partial screen pattern M1. At the same time, a fifth multi grayscale value (which is repeat of one of those of FIGS. 3A-3C) may be displayed as a fifth multi pattern image GM5 disposed a central portion of the partial screen image M1. More specifically, the multi grayscales pattern of FIG. 3D may be displayed in the form of a predetermined checker board pattern whose rectangles are of equal size but contain different grayscale values, for example brighter rectangles alternating with darker rectangles. For example, the first multi pattern image M1 includes first to ninth multi grayscales GM1 to GM9.

Although, the exemplary first multi pattern image M1 includes just nine multi grayscales GM1 to GM9 in the present exemplary embodiment, the present disclosure of inventive concept(s) is not limited thereto and the so-called, "multi-pattern" mode images may contain other numbers of different grayscale values, for example, 12 or 16 (corresponding to a 3×4 array and a 4×4 array respectively).

The multi grayscale region of the display panel 100 represents various luminances and colors due to uniformity of a backlight assembly and uniformity of pixels of the display panel 100 and it also represents a specific viewing angle (e.g., central and head on) according to a position of the first multi pattern image M1 within the larger display area (DA) of the display panel 100.

Thus, when the display panel 100 is compensated based on measured values of the multi grayscale region of the first multi pattern image M1 as well as the different full pattern images (GF1-GFn), the luminance and the color of the display panel 100 may be more accurately compensated for by use of interpolation and normalization as compared to when just the central multi pattern image M1 is used or just the full pattern images (GF1-GFn) are used.

In accordance with the present disclosure, a first compensating value is generated corresponding to displacing respective positions of the centralized multi grayscales in the multi grayscale region to off central portions by way of software processing (for example by way of normalization, interpolation and/or superposition based on the non-displayed pattern that can be predicted based on the measurements taking obtained using the first multi pattern image M1 and the handful of full pattern images (GF1-GFn). After software is used to predictively generate virtual full screen results for the grayscale values for which full screen measurements were not actually taken, the rest of the processing may complete as in previous systems (e.g., the ones that consume more time by taking 25 or more full screen exposures). The predictive process may include a uniformity and viewing angle predicting step (step S200) that takes into account how uniformity and viewing angle change in the sensor readings obtained from the full screen exposures. The predictive process may include a partial screen versus full screen predicting step (step S300) that takes into account how results may change due to measurements taking and readout occurring only from a smaller section of the sensor array rather than its whole area.

When a first compensating value (e.g., determined by normalization and/or interpolation) is added to the measured value of the multi grayscale, the added value may represent the multi grayscale at the central portion GM5 of the first multi pattern image M1.

Figure 4A:
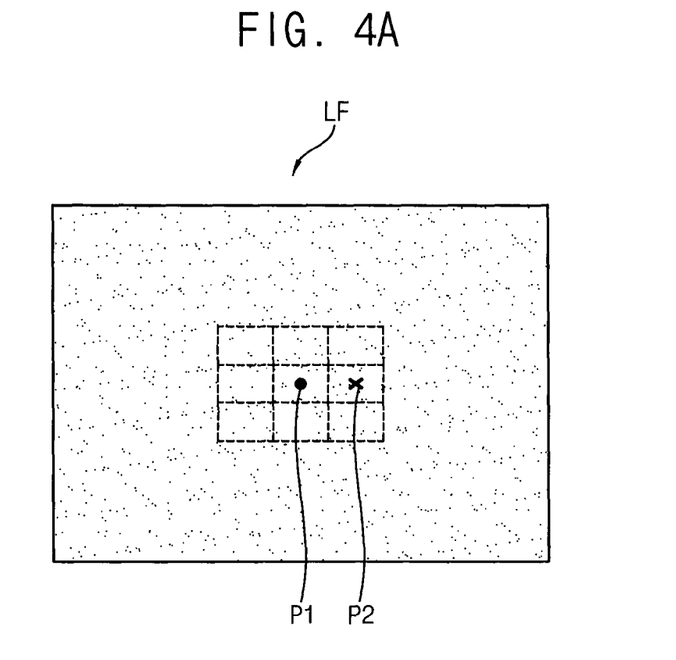
FIGS. 4A to 4C are conceptual diagram illustrating a first image compensation step of FIG. 2.
Figure 4B:
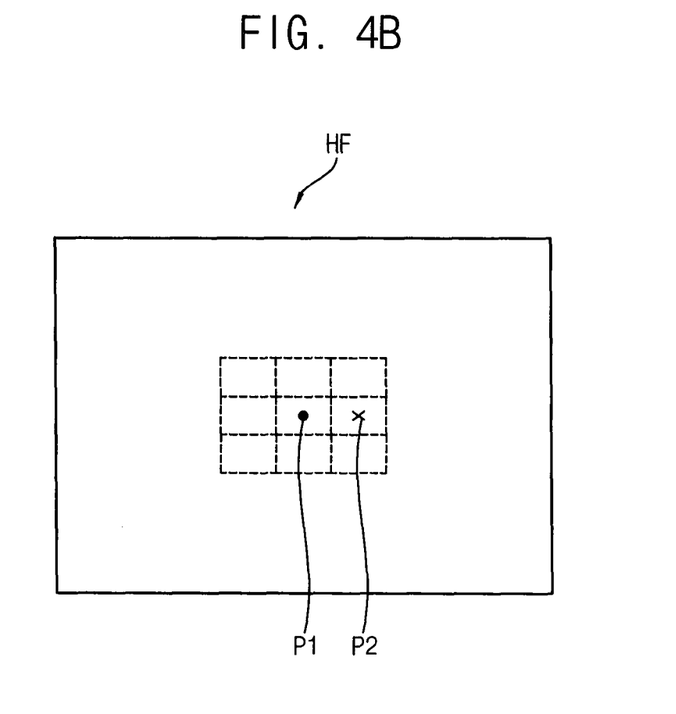
Figure 4C:
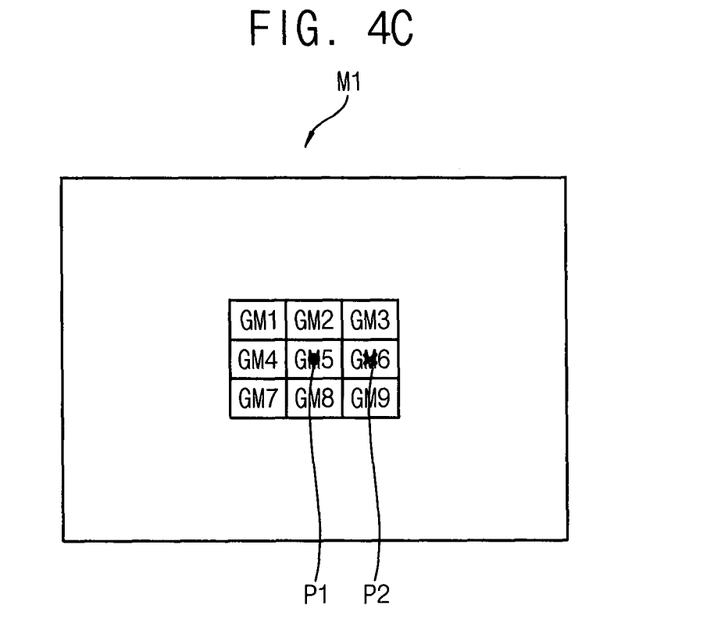

One embodiment of the first image compensation step S200 may be explained in more detail by referring to the example of FIGS. 4A to 4C in detail.

A measured value of the grayscale in the multi pattern image, which is called as a local pattern measured value, may be different from a measured value of the corresponding grayscale in the full pattern image, which is called as a full pattern measured value, for the same grayscale (the repeated grayscale value, e.g., that of GM5) due to a reflectivity idiosyncrasy (e.g., refractive aberration) of a lens of the luminance and color measuring part 600, where the latter is a characteristic of a modulation transfer function of the luminance and color measuring part 600. The deviation may alternatively or additionally be due to crosstalk without the optical sensor array of the luminance and color measuring part 600.

Thus, when the display panel 100 is compensated based on a measured value at the multi grayscale region of the first multi pattern image M1, the luminance and the color of the display panel 100 may not be accurately compensated for so as to consider deviations due to refractive aberration and/or sensor cross talk.

A second compensating value is generated to compensate for a measured difference between the full pattern measured value and the local pattern measured value (step S300).

When the measured value of the multi grayscale is multiplied by the second compensating value, the multi grayscale value in the local pattern may be converted to the multi grayscale value in the full patter value.

Figure 5A:
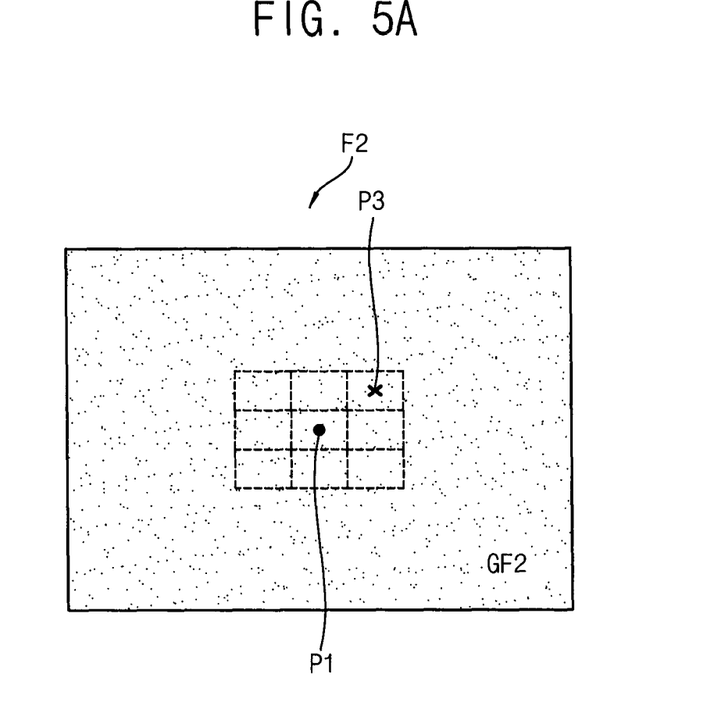
FIGS. 5A and 5B are conceptual diagram illustrating a second image compensation step of FIG. 2.
Figure 5B:
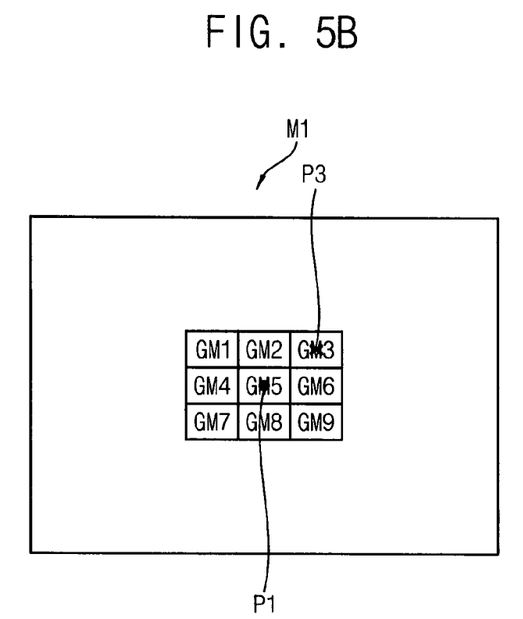

The second image compensation step S300 is explained referring to FIGS. 5A and 5B in detail.

Although the second measurements taking compensating step S300 is operated after the first measurements taking compensating step S200 in the present exemplary embodiment, the present teachings are not limited to this sequence of the first and second measurements taking compensating steps S200 and S300. Alternatively, the first measurements taking compensating step S200 may be carried out after the second measurements taking compensating step S300.

The luminance and the color of the display panel 100 are compensated based on the luminances and the colors of the first full pattern image signals F1, F2 and F3, the luminance and the color of the first multi pattern image M1, the first compensating value and the second compensating value (step S400).

FIGS. 4A to 4C are conceptual diagram illustrating the first measurements taking compensation step S200 of FIG. 2.

Referring to FIGS. 1 and 4A to 4C, in the present exemplary embodiment, a measured value of a sixth multi grayscale GM6 at a second position P2 in FIG. 4C is converted to a predicted value at a first position P1 which is a central portion of the first multi pattern image M1 by use of the calculated first compensating value. (Stated otherwise, a predictive extrapolation factor is found that predicts variation based on stepping away from position P2 to the central position P1 in the case of FIG. 4C and the case of the P2 grayscale value.)

FIG. 4A represents a low full image LF having a low full grayscale which is one of the full grayscales less than the sixth multi grayscale GM6 and adjacent to the sixth multi grayscale GM6. In the present exemplary embodiment, the low full image LF may be substantially the same as the second full pattern image F2 in FIG. 3B.

FIG. 4B represents a high brightness full image HF having a high full grayscale which is one of the full grayscales greater than the sixth multi grayscale GM6 and adjacent to the sixth multi grayscale GM6. In the present exemplary embodiment, the high full image HF may be substantially the same as the third full pattern image F3 in FIG. 3C.

For example, when the multi grayscale of the first multi pattern image M1 is between the first full grayscale GF1 and the second full grayscale GF2, the low full image LF may be the first full pattern image GF1 and the high full image HF may be the second full pattern image GF2.

For example, when the multi grayscale of the first multi pattern image M1 is between the second full grayscale GF2 and the third full grayscale GF3, the low full image LF may be the second full pattern image GF2 and the high full image HF may be the third full pattern image GF3.

The first compensating value may be generated using the high full image HF having the high full grayscale HF and the low full image LF having the low full grayscale LF.

For example, to convert the measured value of the sixth multi grayscale GM6 at the off-center second position P2 in FIG. 4C to the value of the sixth multi grayscale GM6 at the central first position P1, a low grayscale difference between a measured value of the low full grayscale at the first position P1 in the low full image LF in FIG. 4A and a measured value of the low full grayscale at the second position P2 in the low full image LF in FIG. 4A is determined. In addition, to convert the measured value of the sixth multi grayscale GM6 at the second position P2 in FIG. 4C to the value of the sixth multi grayscale GM6 at the first position P1, a high grayscale difference between a measured value of the high full grayscale at the first position P1 in the high full image HF in FIG. 4B and a measured value of the high full grayscale at the second position P2 in the high full image HF in FIG. 4B is determined.

The high grayscale difference and the low grayscale difference may be linearly interpolated using the high full grayscale (e.g. 255 grayscales), the sixth multi grayscale GM6 and the low full grayscale (e.g. 64th shade in the grayscales range) to determine the first compensating value.

A process of converting the measured value of the sixth multi grayscale GM6 at the second position P2 to the value of the sixth multi grayscale GM6 at the first position P1 may be explained referring to following Equations 1 to 5.

In Equations 1 to 5, the low full grayscale is LG, the measured value of the low full image LF at the first position P1 is LG1, the measured value of the low full image LF at the second position P2 is LG2, the low grayscale difference is dLG, the high full grayscale is HG, the measured value of the high full image HF at the first position P1 is HG1, the measured value of the high full image HF at the second position P2 is HG2, the high grayscale difference is dHG, the measured value of the multi grayscale at the second position P2 is XG, a converting ratio is GR, the first compensating value is C1(XG), the converted value of the multi grayscale at the first position P1 is CXG.

$$dLG = LG1 - LG2 \qquad \text{[Equation 1]:}$$

$$dHG = HG1 - HG2 \qquad \text{[Equation 2]:}$$

$$GR = (XG - LG)/(HG - LG) \qquad \text{[Equation 3]:}$$

$$C1(XG) = GR(dHG - dLG) \qquad \text{[Equation 4]:}$$

$$CXG = XG + C1(XG) \qquad \text{[Equation 5]:}$$

FIGS. 5A and 5B are conceptual diagram illustrating the second image compensation step S300 of FIG. 2;

Referring to FIGS. 1 and 5A to 5B, the first multi pattern image M1 includes a common multi grayscale which is the substantially same as one of the full grayscales GF1, GF2 and GF3 of the full pattern images F1, F2 and F3.

In the present exemplary embodiment, a third multi grayscale GM3 of the first multi pattern image M1 may be the substantially same as the second full grayscale GF2 of the second full pattern image F2. Thus, the third multi grayscale GM3 of the first multi pattern image M1 may be the common multi grayscale.

The second compensating value is generated using a ratio between the measured value of the second full grayscale GF2 which is substantially the same as the common multi grayscale GM3 and the measured value of the common multi grayscale GM3 in the first multi pattern image M1.

A measured position of the measured value of the second full grayscale GF2 which is substantially the same as the common multi grayscale GM3 may be the same as a measured position of the measured value of the common multi grayscale GM3 in the first multi pattern image M1.

The position of the common multi grayscale GM3 in the first multi pattern image M1 is a third position P3. Thus, the common multi grayscale GM3 in the first multi pattern image M1 is measured at the third position P3.

To generate the second compensating value, the second full grayscale GF2 which is substantially the same as the common multi grayscale GM3 may be measured at the third position P3 in the second full pattern image F2.

Alternatively, the measured value of the common multi grayscale GM3 at the third position P3 in the first multi pattern image M1 may be converted the value of the common multi grayscale GM3 at the first position P1 by the first measurements taking compensation step S200. Then, to generate the second compensating value, the second full grayscale GF2 which is substantially the same as the common multi grayscale GM3 may be measured at the first position P1 in the second full pattern image F2.

When all the multi grayscales in the first multi pattern image M1 are multiplied by the second compensating value, the local pattern measured values measured at the local pattern may be converted to a predicted (virtual) full pattern of measured values as if measured at the full pattern even though they were not.

Figure 6A:
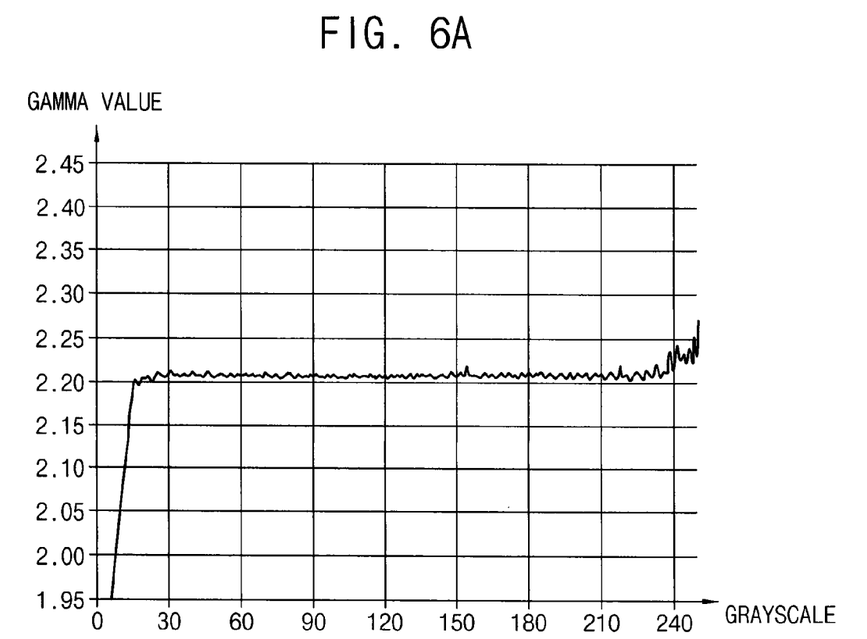
FIG. 6A is a graph illustrating a gamma value by the image compensation of the display panel of FIG. 1.
Figure 6B:
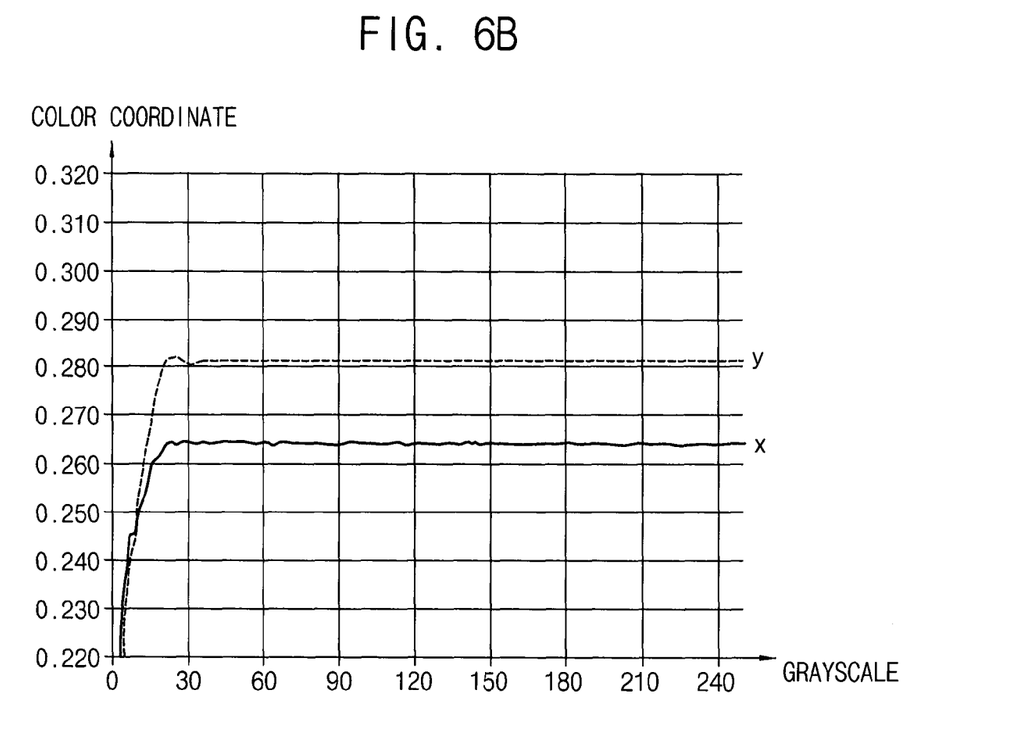
FIG. 6B is a graph illustrating a color coordinate by the image compensation of the display panel of FIG. 1.

FIG. 6A is a graph illustrating the gamma value by the image compensation of the display panel 100 of FIG. 1. FIG. 6B is a graph illustrating the color coordinate by the image compensation of the display panel 100 of FIG. 1.

Referring to FIGS. 1 to 6B, the luminances and the color coordinates may be substantially uniform according to the grayscales by the method of compensating the image of the display panel 100.

In FIG. 6A, the gamma values of the display panel 100 may be substantially uniform except for those of grayscale values that are less than GS=30 (in the exemplary range of 0-255 grayscales). The gamma value of the display panel 100 may be about 2.2.

In FIG. 6B, the color coordinates of the display panel 100 may be substantially uniform except for those of grayscale values that are less than GS=30 (in the exemplary range of 0-255 grayscales). An x coordinate of the color coordinate (1931 CIE standard) of the display panel 100 may be about 0.26. A y coordinate of the color coordinate of the display panel 100 may be about 0.28.

According to the present exemplary embodiment, the luminance and the color are compensated using the full pattern image and the multi pattern image so that time for measurements taking for the display panel 100 may be dramatically decreased.

In addition, the difference between measured values according to the position in the multi grayscale region and the difference between the full pattern measured value and the local pattern measured value are compensated for so that the luminance and the color of the display panel 100 may be accurately compensated for.

Therefore, the gamma values and the color coordinates may be compensated for all of the display panels in a mass production batch so that reliability of each display apparatus in the mass-produced batch may be dramatically improved.

FIG. 7 is a block diagram illustrating a display apparatus that may be used in the above described methods of driving the display panel 100 while posing in front of the camera 600 (which drive method can further include the method of compensating the "multi-pattern" mode images so as to generate virtualized full screen measurements in accordance with FIG. 2).

Referring to FIGS. 1 to 7, the display apparatus includes a display panel 100 and a panel driver. The panel driver includes a timing controller 200, a gate lines driver 300, a gamma reference voltage generator 400 and a data lines driver 500.

The display panel 100 has a display region (DA) on which an image is displayed and a non-displaying peripheral region adjacent to the display region.

The display panel 100 includes a plurality of gate lines GL, a plurality of data lines DL and a plurality of unit pixels connected to the gate lines GL and the data lines DL. The gate lines GL extend in a first direction D1 and the data lines DL extend in a second direction D2 crossing the first direction D1.

Each unit pixel includes a switching element (not shown), a liquid crystal capacitor (not shown) and a storage capacitor (not shown). The liquid crystal capacitor and the storage capacitor are electrically connected to the switching element. The unit pixels may be disposed in a matrix form.

The timing controller 200 receives input image data RGB and an input control signal CONT from an external apparatus (not shown). The input image data may include red image data R, green image data G and blue image data B. The input control signal CONT may include a master clock signal and a data enable signal. The input control signal CONT may include a vertical synchronizing signal and a horizontal synchronizing signal.

The timing controller 200 generates a first control signal CONT1, a second control signal CONT2, a third control signal CONT3 and a data signal DATA based on the input image data RGB and the input control signal CONT.

The timing controller 200 generates the first control signal CONT1 for controlling an operation of the gate lines driver 300 based on the input control signal CONT, and outputs the first control signal CONT1 to the gate lines driver 300. The first control signal CONT1 may further include a vertical start signal and a gate clock signal.

The timing controller 200 generates the second control signal CONT2 for controlling an operation of the data lines driver 500 based on the input control signal CONT, and outputs the second control signal CONT2 to the data lines driver 500. The second control signal CONT2 may include a horizontal start signal and a load signal.

The timing controller 200 generates the data signal DATA based on the input image data RGB. The timing controller 200 may be programmably configured (calibrated) to counter-compensate for luminance and color idiosyncrasies of the display panel 100 by adding compensating values to the input image data RGB based on luminance and the color compensations derived from the measurements taking using the full pattern images F1, F2 and F3 (each of which includes a single full grayscale GF1, GF2 and GF3) and using the multi pattern image M1 which includes a plurality of multi grayscales GM1 to GM9. Virtualization of the partial screen samples of the "multi-pattern" image M1 into corresponding, but virtual full screen pattern may make use a first compensating value which accounts for displacing the position of the multi grayscale portions GM1 to GM9 in the multi pattern image M1 to the central portion of the multi pattern image M1 and of a second compensating value which accounts for the difference of the full pattern measured values and the local pattern measured values. The timing controller 200 outputs the calibrated data signal DATA to the data driver 500.

The timing controller 200 generates the third control signal CONT3 for controlling an operation of the gamma reference voltage generator 400 based on the input control signal CONT, and outputs the third control signal CONT3 to the gamma reference voltage generator 400.

The gate lines driver 300 generates gate signals driving the gate lines GL in response to the first control signal CONT1 received from the timing controller 200. The gate lines driver 300 sequentially outputs the gate signals to the gate lines GL.

The gate lines driver 300 may be directly mounted on the display panel 100, or may be connected to the display panel 100 as a tape carrier package ("TCP") type. Alternatively, the gate lines driver 300 may be monolithically integrated on the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA.

In an exemplary embodiment, the gamma reference voltage generator 400 may be disposed in the timing controller 200, or in the data driver 500.

The data lines driver 500 receives the second control signal CONT2 and the data signal DATA from the timing controller 200, and receives the gamma reference voltages VGREF from the gamma reference voltage generator 400. The data driver 500 converts the data signal DATA into data voltages having an analog type using the gamma reference voltages VGREF. The data lines driver 500 outputs the data voltages to the data lines DL.

The data lines driver 500 may include a shift register (not shown), a latch (not shown), a signal processing part (not shown) and a buffer part (not shown). The shift register outputs a latch pulse to the latch. The latch temporally stores the data signal DATA. The latch outputs the data signal DATA to the signal processing part. The signal processing part generates a data voltage having an analog type based on the data signal having a digital type and the gamma reference voltage VGREF. The signal processing part outputs the data voltage to the buffer part. The buffer part compensates the data voltage to have a uniform level. The buffer part outputs the compensated data voltage to the data line DL.

The data lines driver 500 may be directly mounted on the display panel 100, or be connected to the display panel 100 in a TCP type. Alternatively, the data lines driver 500 may be monolithically integrated on the display panel 100.

According to the present inventive concept as explained above, the gamma value and the color coordinate are compensated for using measurement takings using just a few full pattern images and at least one multi pattern image so that time for measurements taking may be decreased. In addition, error due to use of the multi pattern image in place of a plurality of full screen images is compensated for so that the gamma value and the color coordinate of the image may be accurately compensated. Thus, reliability of the display panel may be improved.

The foregoing is illustrative of the present disclosure of inventive concept(s) and is not to be construed as limiting thereof. Although a few exemplary embodiments have been described, those skilled in the art will readily appreciate in view of the foregoing that many modifications are possible in the exemplary embodiments without materially departing from the novel approaches and advantages of the present teachings. Accordingly, all such modifications are intended to be included within the scope of the present disclosure. In the claims, means-plus-function clauses are intended to cover the structures described herein as performing the recited function and not only structural equivalents but also equivalent structures.

What is claimed is:

1. A machine implemented method of compensating an image of a display panel, the method comprising:
   capturing a plurality of full pattern images corresponding to a plurality of full grayscales, each full pattern image being the image of an entire display area of the display panel;
   measuring luminance and color of the plurality of full pattern images, each of the full pattern images including a single full grayscale of the full gray scales;
   measuring luminance and color of a multi pattern image, the multi pattern image including a plurality of multi grayscales;
   generating a first compensating value to displace a position of a multi grayscale region in the multi pattern image to a central portion of the multi pattern image; and
   compensating luminance and color of the display panel based on the luminance and the color of the full pattern image, the luminance and the color of the multi pattern image and the first compensating value,
   wherein the first compensating value is generated based on measurements taken from a high full image and a low full image, the high full image having a high full grayscale which is one of the full grayscales greater than and adjacent to a multi grayscale of the multi grayscale region, the low full image having a low full grayscale which is one of the full grayscales less than and adjacent to the multi grayscale of the multi grayscale region,
   wherein the generating of the first compensating value comprises:
   determining a first difference between a measured value of the high full grayscale at a first position and a measured value of the high full grayscale at a second position in the high full image and a second difference between a measured value of the low full grayscale at the first position and a measured value of the low full grayscale at the second position in the low full image, the first position being the central portion of the multi pattern image, the second position being the position of the multi grayscale region; and
   linearly interpolating the first difference and the second difference using the high full grayscale, the multi grayscale of the multi grayscale region and the low full grayscale.

2. The method of claim 1, wherein the multi pattern image includes a common multi grayscale which is substantially the same as one of the full grayscales.

3. The method of claim 2, further comprising generating a second compensating value using a ratio between a measured value of the full grayscale which is substantially the same as the common multi grayscale and a measured value of the common multi grayscale in the multi pattern image.

4. The method of claim 3, wherein a measured position of the measured value of the full grayscale which is substantially the same as the common multi grayscale is substantially the same as a measured position of the measured value of the common multi grayscale in the multi pattern image.

5. The method of claim 1, wherein a number of the full pattern images is greater than or equal to three.

6. The method of claim 1, wherein a number of multi pattern images is two, and
   a first multi pattern image among the multi pattern images corresponds to relatively low grayscales and a second multi pattern image among the multi pattern images corresponds to relatively high grayscales.

7. A method of compensating an image of a display panel, the method comprising:
   capturing a plurality of full pattern images corresponding to a plurality of full grayscales, each full pattern image being the image of an entire display area of the display panel;
   measuring luminance and color of a plurality of full pattern images corresponding to a plurality of full grayscales, each of the full pattern images including a single full grayscale of the full grayscales;
   measuring luminance and color of a multi pattern image, the multi pattern image including a plurality of multi grayscales;
   generating a first compensating value to displace a position of a multi grayscale region in the multi pattern image to a central portion of the multi pattern image;
   compensating luminance and color of input image data based on the input image data, the luminance and the color of the full pattern image, the luminance and the color of the multi pattern image and the first compensating value to generate a data signal; and
   displaying an image on the display panel based on the data signal,
   wherein the first compensating value is generated using a high full image and a low full image, the high full image having a high full grayscale which is one of the full grayscales greater than and adjacent to a multi grayscale of the multi grayscale region, the low full image having a low full grayscale which is one of the full grayscales less than and adjacent to the multi grayscale of the multi grayscale region,
   wherein the generating of the first compensating value comprises:
   determining a first difference between a measured value of the high full grayscale at a first position and a measured value of the high full grayscale at a second position in the high full image and a second difference between a measured value of the low full grayscale at the first position and a measured value of the low full grayscale at the second position in the low full image, the first position being the central portion of the multi pattern image, the second position being the position of the multi grayscale region; and linearly interpolating the first difference and the second difference using the high full grayscale, the multi grayscale of the multi grayscale region and the low full grayscale.

8. The method of claim 7, wherein the multi pattern image includes a common multi grayscale which is substantially the same as one of the full grayscales.

9. The method of claim 8, further comprising generating a second compensating value using a ratio between a measured value of the full grayscale which is substantially the same as the common multi grayscale and a measured value of the common multi grayscale in the multi pattern image.

10. The method of claim 7, wherein a number of the full pattern images is greater than or equal to three.

11. A display apparatus comprising:
a timing controller configured to compensate luminance and color of input image data to generate a data signal based on the input image data, luminance and color of a plurality of full pattern images corresponding to a plurality of full grayscales, luminance and color of a multi pattern image and a first compensating value to displace a position of a multi grayscale region in the multi pattern image to a central portion of the multi pattern image, each of the full pattern images including a single full grayscale of the full grayscales, the multi pattern image including a plurality of multi grayscales;
a data driver configured to convert the data signal into a data voltage having an analog type; and
a display panel configured to display an image based on the data voltage,
wherein each full pattern image is a captured image of an entire display area of the display panels,
wherein the first compensating value is generated using a high full image and a low full image, the high full image having a high full grayscale which is one of the full grayscales greater than and adjacent to a multi grayscale of the multi grayscale region, the low full image having a low full grayscale which is one of the full grayscales less than and adjacent to the multi grayscale of the multi grayscale region,
wherein, to generate the first compensating value, the timing controller is configured to:
determine a first difference between a measured value of the high full grayscale at a first position and a measured value of the high full grayscale at a second position in the high full image and a second difference between a measured value of the low full grayscale at the first position and a measured value of the low full grayscale at the second position in the low full image, the first position being the central portion of the multi pattern image, the second position being the position of the multi grayscale region, and linearly interpolate the first difference and the second difference using the high full grayscale, the multi grayscale of the multi grayscale region and the low full grayscale.

12. The display apparatus of claim 11, wherein the multi pattern image includes a common multi grayscale which is substantially the same as one of the full grayscales.

13. The display apparatus of claim 12, wherein the timing controller is further configured to generate a second compensating value using a ratio between a measured value of the full grayscale which is substantially the same as the common multi grayscale and a measured value of the common multi grayscale in the multi pattern image.

14. The display apparatus of claim 11, wherein a number of the full pattern images is greater than or equal to three.

15. A machine implemented and automated method for quickly determining luminance and color compensation values for a display panel having a display area populated by a matrix of pixels, where each pixel is independently drivable over a predetermined range of grayscales, the method comprising:
first driving all the pixels with a first single full grayscale signal to thereby produce a corresponding first full screen image and using a sensor array to measure luminance and color attributes of the produced first full screen image;
second driving all the pixels with a different second single full grayscale signal to thereby produce a corresponding second full screen image and using the sensor array to measure luminance and color attributes of the produced second full screen image;
third driving only a subset of the pixels of the display area with a corresponding multi pattern signal to thereby produce a corresponding multi pattern image having a predetermined spatial arrangement of darker and lighter regions and using the sensor array to measure respective luminances and color attributes of the respective and spatially arranged darker and lighter regions of the multi pattern image corresponding to only the subset of the pixels;
using the measured luminances and color attributes of the multi pattern image and of the first and second full screen images to generate luminance and color calibrating factors for the display panel.

* * * * *